(12) United States Patent
Xu et al.

(10) Patent No.: US 8,587,942 B2
(45) Date of Patent: Nov. 19, 2013

(54) HEAT DISSIPATING APPARATUS AND ELECTRONIC DEVICE WITH HEAT DISSIPATING APPARATUS

(75) Inventors: Li-Fu Xu, Shenzhen (CN); Zhi-Guo Zhang, Shenzhen (CN); Chao Geng, Shenzhen (CN); Chong Cai, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 322 days.

(21) Appl. No.: 13/164,447

(22) Filed: Jun. 20, 2011

(65) Prior Publication Data
US 2012/0099270 A1   Apr. 26, 2012

(30) Foreign Application Priority Data
Oct. 25, 2010   (CN) .......................... 2010 1 0518262

(51) Int. Cl.
*H05K 7/20* (2006.01)
(52) U.S. Cl.
USPC .... 361/695; 361/679.48; 165/121; 415/213.1

(58) Field of Classification Search
USPC ............... 361/676–678, 679.46–679.51, 361/688–690, 694–695
See application file for complete search history.

(56) References Cited

U.S. PATENT DOCUMENTS

| | | | | |
|---|---|---|---|---|
| 6,113,485 A * | 9/2000 | Marquis et al. | ............... | 454/184 |
| 6,181,556 B1 * | 1/2001 | Allman | ............... | 361/690 |
| 6,282,090 B1 * | 8/2001 | Johnson et al. | ............... | 361/695 |
| 6,496,368 B2 * | 12/2002 | Jui-Yuan | ............... | 361/697 |
| 6,657,863 B2 * | 12/2003 | Lee et al. | ............... | 361/697 |
| 6,920,044 B2 * | 7/2005 | Lin | ............... | 361/697 |
| 2003/0156385 A1 * | 8/2003 | Askeland et al. | ............... | 361/687 |
| 2005/0180102 A1 * | 8/2005 | Kim | ............... | 361/694 |
| 2006/0032616 A1 * | 2/2006 | Yang | ............... | 165/104.33 |
| 2007/0047200 A1 * | 3/2007 | Huang | ............... | 361/695 |
| 2011/0067836 A1 * | 3/2011 | Tang et al. | ............... | 165/67 |
| 2011/0317362 A1 * | 12/2011 | Chen | ............... | 361/695 |

* cited by examiner

*Primary Examiner* — Courtney Smith
(74) *Attorney, Agent, or Firm* — Altis & Wispro Law Group, Inc.

(57) ABSTRACT

A heat dissipating apparatus includes a first fan and a second fan. A clipping portion with a block is located on the first fan. A receiving hole is defined in the second fan, and two first retaining panels and a second retaining panel extend from the second fan. The two first retaining panels are substantially parallel to each other and perpendicular to the second retaining panel. The clipping portion is located between the two retaining panels and abuts the first retaining panel, and the block is engaged in the receiving hole.

19 Claims, 3 Drawing Sheets

HEAT DISSIPATING APPARATUS AND ELECTRONIC DEVICE WITH HEAT DISSIPATING APPARATUS

BACKGROUND

1. Technical Field

The present disclosure relates to electronic devices, more particularly to an electronic device with a heat dissipating apparatus.

2. Description of Related Art

Heat dissipating devices perform the critical function of removing heat from an electronic device. The heat dissipating device often includes one or more fans received in a bracket. For example, in a server system, a plurality of fans is provided to efficiently dissipate heat. The fans are secured to a bracket, and the bracket is mounted in a server enclosure. Airflow from outside is directed out of the electronic device by the fan, for dissipating heat generated in the electronic device. However, if the air flows in a disorderly manner in the electronic device, it will decrease heat dissipating efficiency of the electronic device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
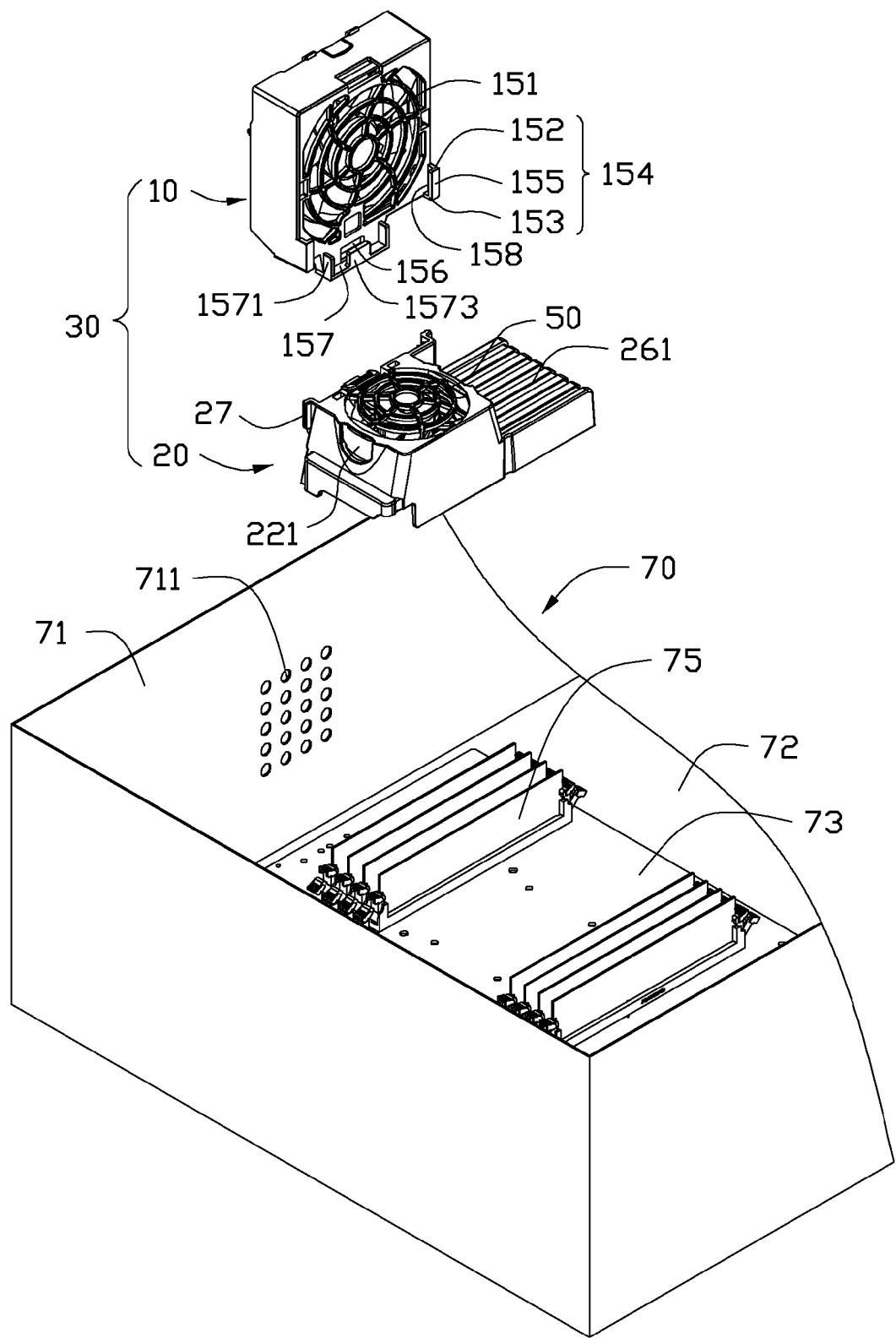
FIG. 1 is an exploded, isometric view of an electronic device in accordance with an embodiment.
Figure 2:
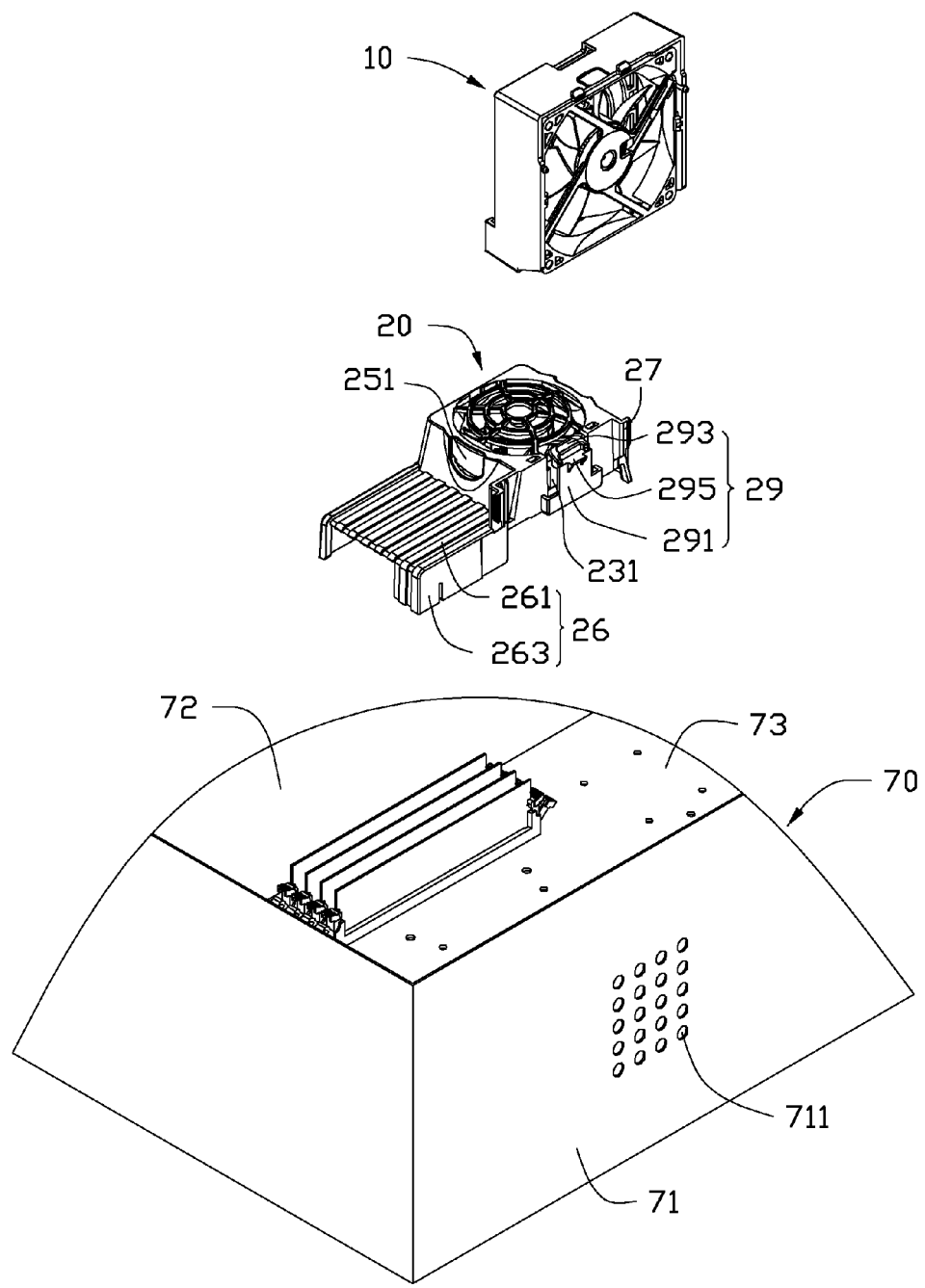
FIG. 2 is similar to FIG. 1, but viewed from a different aspect.

Referring to FIGS. 1 and 2, an electronic device in accordance with an embodiment includes a computer case 70 and a heat dissipating apparatus 30 received in the computer case 70.

The computer case 70 includes a bottom plate 72 and a side plate 71 integrally formed therewith or otherwise coupled thereto. The computer case 70 can have various configurations, such as different wall or base configurations so long as the bottom plate 72 is adapted to couple with a cover (not shown) to create a housing.

A motherboard 73 is attached to the bottom plate 72, and a plurality of memory cards 75 is mounted to the motherboard 73. Various configurations of the plurality of memory cards 75 are known by those skilled in the art. In one embodiment, the plurality of memory cards 75 generates a lot of heat, which can increase the temperature of the computer case 70. A plurality of ventilation holes 711 is defined in the side plate 71. Air from outside of the computer case 70, flows into the computer case 70 via the plurality of ventilation holes 711.

The heat dissipating apparatus 30 includes a first fan 20 and a second fan 10 attached to the first fan 20. A first through hole 50 is defined in the first fan 20, and two accommodating portions 221, 251 are located at opposite sides of the first fan 20. Two sliding portions 27 extend from a side of the first fan 20, and a clipping portion 29 are located between the two sliding portions 27. The clipping portion 29 includes a main body 291, an operating portion 293 and a block 295 located on the main body 291. In one embodiment, two cutouts 231 are located opposite side of the main body 291, and the operating portion 293 and the top plate of the first fan 20 are located on the same plane.

A duct 26 is connected to the first fan 20 and includes a top panel 261 and two side panels 263 respectively connected to opposite sides of the top panel 261. The duct 26 surrounds the plurality of memory cards 75, and guides the air flow adjacent to the plurality of memory cards 75.

The second fan 10 draws the air out of the computer case 70 and defines a second through hole 151 and a receiving hole 156, adjacent to the second through hole 151. The second through hole 151 corresponds to the plurality of ventilation holes 711. The receiving hole 156 receives the block 295 of the first fan 20.

Two positioning portions 154 are respectively located on two bottom corners of the second fan 10. Each positioning portion 154 includes a first positioning piece 152, a second positioning piece 153 and a third positioning piece 155, located between the first positioning piece 152 and the second positioning piece 153. The first positioning piece 152 extends substantially perpendicular from a side of the second fan 10. The second positioning piece 153 extends substantially perpendicular from a bottom side of the second fan 10. The first, second and third positioning piece 152, 153, 155 cooperatively define a positioning hole 158, for receiving the sliding portion 27 of the first fan 20. One of ordinary skill in the art will also realize that by this disclosure the positioning portions 154 are not limited to the present configuration. Rather, other configurations can be used in other embodiments, for example, a solid post so long as it has a positioning hole 158.

An extending panel 157 extends from a bottom edge of the second fan 10. Two first retaining panels 1571 and a second retaining panel 1573 are substantially perpendicular to the extending panel 157. In one embodiment, the two first retaining panels 1571 are substantially parallel to each other, and a space, that receives the main body 291, is defined between each first retaining panel 1571 and the second retaining panel 1573, so that the second retaining panel 1573 is separated from the two first retaining panels 1571.

Figure 3:
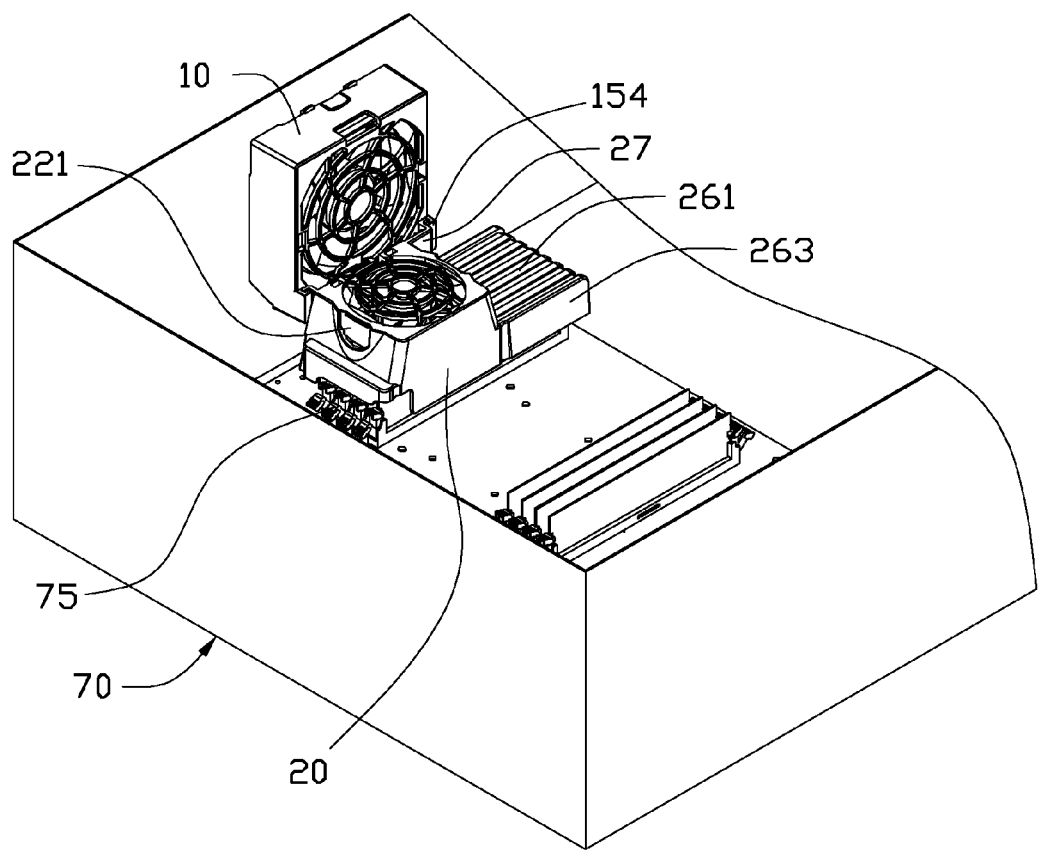
FIG. 3 is an assembled view of FIG. 1.

Referring to FIG. 3, in assembly, the second through hole 50 of the second fan 10 is aligned with the plurality of ventilation holes 711. The second fan 10 is mounted to the side plate 71 with fasteners (not shown). The fasteners can take the form of a screw with an associated washer or other appropriate means for coupling one element to another element.

The first fan 20 is located above the second fan 10 and moved downward near to the bottom plate 72, to deform the clipping portion 29, until the block 295 is engaged into the receiving hole 156, and the two sliding portions 27 are engaged in the positioning hole 158. The main body 291 is located between the two first retaining panels 1571 and abuts the second retaining panel 1573. The two first retaining panels 1571 are engaged in the two cutouts 231. The top panel 261 of the duct 26 covers the plurality of memory cards 75, and the two side panels 263 are located at opposite sides of the plurality of memory cards 75 and are substantially parallel to each memory card 75. Thus, the plurality of memory cards 75 is received in the duct 26. In one embodiment, the first fan 20 is substantially perpendicular to the second fan 10.

In use, air flows into the computer case 70 via a plurality of entering holes (not shown) of the computer case 70, adjacent to the plurality of memory cards 75 and the first fan 20. Then, the air flows through the second fan 10, and out of the computer case 70 via the plurality of ventilation holes 711. Therefore, heat generated from the plurality of memory cards 75 can be effectively removed.

In disassembly, the operating portion 293 is operated to deform the clipping portion 29, so that the block 295 is removed from the receiving hole 156. The first fan 20 is moved upward, and the sliding portion 27 is disengaged from the positioning hole 158. Therefore, the first fan 20 is disengaged from the second fan 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A heat dissipating apparatus comprising:
   a first fan; the first fan comprising a clipping portion, and the clipping portion comprising a block and a main body; and two cutouts are defined in opposite side of the main body;
   a second fan secured to the first fan; a receiving hole defined in the second fan, and the second fan comprising two first retaining panels and a second retaining panel; the two first retaining panels substantially parallel to each other and perpendicular to the second retaining panel;
   wherein the two first retaining panels are received in the two cutouts; the clipping portion is located between the two first retaining panels and blocked by the second retaining panel, and the block is engaged in the receiving hole.

2. The heat dissipating apparatus of claim 1, wherein the first fan is substantially perpendicular to the second fan.

3. The heat dissipating apparatus of claim 1, wherein a space is defined between each first retaining panel and the second retaining panel, and the main body is engaged in the space.

4. The heat dissipating apparatus of claim 1, wherein the clipping portion further comprises an operation portion connected to the main body, and the operation portion and a top plate of the first fan are located on the same plane.

5. The heat dissipating apparatus of claim 1, wherein an extending panel extends from of the second fan, and the two first retaining panels and the second retaining panel are substantially perpendicular to the extending panel.

6. The heat dissipating apparatus of claim 1, wherein a positioning portion is located on a corner of the second fan, a positioning hole is defined in the positioning portion, and a sliding portion is located on the first fan and received in the positioning portion.

7. The heat dissipating apparatus of claim 6, wherein the positioning portion comprises a first positioning piece, a second positioning piece substantially perpendicular to the first positioning piece, and a third positioning piece, located between the first positioning piece and the second positioning piece; and the first positioning piece, the second positioning piece and the third positioning piece define the positioning hole.

8. The heat dissipating apparatus of claim 1, wherein a duct is connected to the first fan, and the duct is adapted to receive a plurality of memory cards.

9. The heat dissipating apparatus of claim 8, wherein the duct comprises a top panel and two side panels connected to the top panel; the top panel is adapted to cover on the plurality of memory cards; and the two side panels are adapted to be located on opposite sides of the plurality of memory cards and are substantially parallel to each memory card.

10. An electronic device comprising:
    a computer case comprising a bottom plate and a side plate connected to the bottom plate; a motherboard, securing a plurality of memory cards, attached to the bottom plate, and a plurality of ventilation holes defined in the side plate; and
    a heat dissipating apparatus, received in the computer case, comprising:
    a first fan attached to the plurality of memory cards; the first fan comprising a clipping portion, and the clipping portion comprising a block;
    a second fan attached to the side plate and secured to the first fan; a through hole and a receiving hole defined in the second fan, and the second fan comprising two first retaining panels and a second retaining panel; the through hole aligned with the plurality of ventilation holes; the two first retaining panels substantially parallel to each other and perpendicular to the second retaining panel;
    wherein the second fan is slidable relative to the first fan in a direction that is substantially perpendicular to the bottom plate; the clipping portion is located between the two first retaining panels and blocked by the second retaining panel, and the block is engaged in the receiving hole.

11. The electronic device of claim 10, wherein the first fan is substantially perpendicular to the second fan.

12. The electronic device of claim 10, wherein the clipping portion comprises a main body, two cutouts are defined in opposite side of the main body, and the two first retaining panels are received in the two cutouts.

13. The electronic device of claim 12, wherein a space is defined between each first retaining panel and the second retaining panel, and the main body is engaged in the space.

14. The electronic device of claim 12, wherein the clipping portion further comprises an operation portion connected to the main body, and the operation portion and a top plate of the first fan are located on a plane.

15. The electronic device of claim 10, wherein an extending panel extends outside of the second fan, and the two first retaining panels and the second retaining panel are substantially perpendicular to the extending panel.

16. The electronic device of claim 10, wherein a positioning portion is located on a corner of the second fan, a positioning hole is defined in the positioning portion, and a sliding portion is located on the first fan and received in the positioning portion.

17. The electronic device of claim 16, wherein the positioning portion comprises a first positioning piece, a second positioning piece substantially perpendicular to the first positioning piece, and a third positioning piece, located between the first positioning piece and the second positioning piece; and the first positioning piece, the second positioning piece and the third positioning piece define the positioning hole.

18. The electronic device of claim 10, wherein a duct is connected to the first fan, the duct receives the plurality of memory cards, and the duct, the first fan and the second fan defines an air path for air passed through.

19. The electronic device of claim 18, wherein the duct comprises a top panel and two side panels connected to the top panel; the top panel is adapted to cover on the plurality of memory cards; and the two side panels are adapted to be located on opposite sides of the plurality of memory cards and are substantially parallel to each memory card.

\* \* \* \* \*